(No Model.)
G. F. MESSINGER.
BALL PITMAN.
No. 278,812. Patented June 5, 1883.
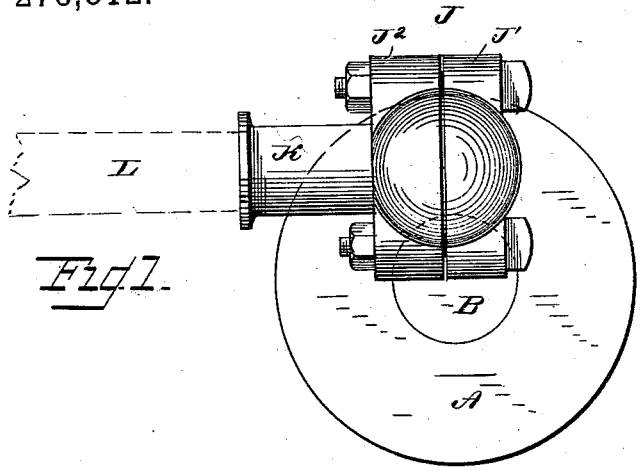
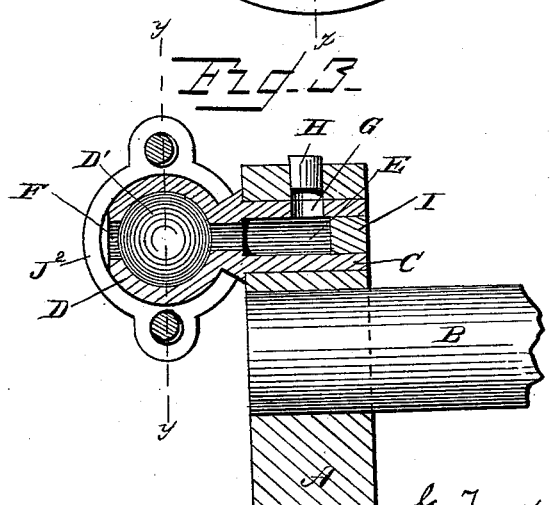
WITNESSES
F. L. Ourand
M. V. Smith
INVENTOR
G. Frank Messinger
By John L. Wilson and F. A. Fouts
Attorneys.

UNITED STATES PATENT OFFICE.

G. FRANK MESSINGER, OF STOCKERTOWN, PENNSYLVANIA.

BALL-PITMAN.

SPECIFICATION forming part of Letters Patent No. 278,812, dated June 5, 1883.

Application filed January 11, 1883. (No model.)

*To all whom it may concern:*

Be it known that I, G. FRANK MESSINGER, a citizen of the United States, residing at Stockertown, in the county of Northampton and State of Pennsylvania, have invented certain new and useful Improvements in Ball-Pitmen, of which the following is a specification, reference being had therein to the accompanying drawings.

My invention relates to ball-pitmen; and it consists in providing the ball and its shank with a central longitudinal opening adapted to receive oil for lubricating the exterior of the ball, the supply being regulated by the longitudinal adjustment of the spherical box containing the ball, all of which will be more fully hereinafter described, and pointed out in the claims.

In the accompanying drawings, Figure 1 represents a side elevation of the crank-wheel, box, and pitman-head, a fragment of the pitman-rod being shown in dotted lines. Fig. 2 is a side elevation of the crank-wheel, the pitman-head, box, bolts, and ball being shown in section, as per line $yy$, Fig. 3. Fig. 3 is a vertical section taken through the line $xx$ of Fig. 2.

Similar letters refer to similar parts throughout the several views.

A is the crank-wheel on the end of the shaft B.

C is the shank of ball D.

D' is a spherical opening in ball D, having communicating openings E and F.

G is an opening in the side of shank C, which communicates with opening E.

H is a plug filling the end of an opening in the periphery of wheel A. Said opening registers with opening G.

I is a plug in the rear end of opening E.

J is the box, consisting of parts $J'$ $J^2$.

K is the pitman-head formed integral with the half-box $J^2$.

L is the fragment of the pitman-rod, secured to the threaded recess of the head K.

M M are bolts having nuts N N, said bolts passing through openings in the lugs on the top and bottom of box J, whereby said box is secured to the ball. The openings in the lugs on $J^2$ or pitman-head part are threaded and engage the threads on the bolts.

The object of my improvement is to lubricate the ball-joint, provide means for carrying a goodly supply of oil, and also means for regulating the distribution thereof.

The device is operated as follows: After the parts have been connected and the bolts M M screwed in the lugs, so as to draw the box parts $J'$ $J^2$ closely together, the plug H should be removed and oil poured through the opening G until the openings F, D', and E are full. The plug H should then be replaced. Then, by slightly loosening the bolts M M and revolving the wheel A, the outer surface of the ball will become thoroughly lubricated, and the oil passing out of the opening F around the exterior of the ball. When it is desired to lessen the flow of oil, the bolts should be tightened. By slightly tightening the bolts the flow is only partially checked; but by tightening them to a degree that will draw the two parts $J'$ $J^2$ closely together the flow may be wholly stopped. When the pitman is not in operation the flow may be thus cut off, and when service is resumed the bolts may be loosened to admit the requisite supply. It will thus be seen that by the longitudinal adjustment of the box parts $J'$ $J^2$ on the threaded bolts M M the flow of oil may be regulated or wholly stopped.

Having thus described my invention and set forth its advantages, I claim as new and desire to secure by Letters Patent—

1. A hollow ball and shank, the shank being plugged in the rear and provided with a side opening, in combination with a box, longitudinally adjustable, as set forth.

2. A crank-wheel provided with a ball-crank and shank, said ball and shank having an opening extending through longitudinally, the shank being also provided with a side opening communicating with an opening in the periphery of the wheel, whereby the longitudinal openings in the crank and ball may be filled with oil when the ends thereof are closed, in the manner specified.

3. A crank-wheel provided with a shank and ball-crank, said shank and ball having a longitudinal communicating opening, the rear end of the shank-opening being plugged, said openings being adapted to contain oil, the side of the shank having an opening which communicates with the opening in the periphery of the wheel, in combination with a two-part box provided with means for its longitudinal adjustment, whereby the lubricating flow of oil is regulated.

4. A hollow ball-crank and shank, said shank being plugged at its rear end and provided with a feed-opening communicating with an opening in the opening of the crank-wheel, the ball having a flat-mouthed opening, which communicates with the inside opening in the ball, whereby an oil-space is formed between the mouth of the ball and encircling box, substantially as specified.

5. The combination of the pitman-head K, box J, hollow crank D, shank C, and wheel A on shaft B, the shank C being provided with a central rear-plugged opening communicating with the opening in the ball, and a side opening communicating with an opening in the periphery of the wheel, substantially as described, and for the purposes specified.

6. The hollow shank C, provided with the hollow ball D, the outer surface of the connecting part of said shank being bevel, in combination with the box J, provided with an inside bevel-opening adapted to encircle the bevel-shank, whereby said box is held away from the crank-wheel, as shown.

In testimony whereof I affix my signature in presence of two witnesses.

G. FRANK MESSINGER.

Witnesses:
 JNO. L. WILSON,
 GEO. FINLEY.